(12) United States Patent
Nicewonger et al.

(10) Patent No.: US 12,467,778 B1
(45) Date of Patent: Nov. 11, 2025

(54) METHOD FOR MANAGING INFORMATION IN LIQUID VELOCITY MEASUREMENT

(71) Applicant: Proteus Industries Inc., Mountain View, CA (US)

(72) Inventors: Mark R Nicewonger, Mountain View, CA (US); Anh H Nguyen, Ho Chi Minh (VN)

(73) Assignee: Proteus Industries Inc., Mountain View, CA (US)

( * ) Notice: Subject to any disclaimer, the term of this patent is extended or adjusted under 35 U.S.C. 154(b) by 441 days.

(21) Appl. No.: 18/085,558

(22) Filed: Dec. 20, 2022

Related U.S. Application Data

(60) Provisional application No. 63/291,947, filed on Dec. 20, 2021.

(51) Int. Cl.
*G01F 15/00* (2006.01)

(52) U.S. Cl.
CPC .................................. *G01F 15/00* (2013.01)

(58) Field of Classification Search
CPC ........................................................ G01F 15/00
USPC ............................................................. 702/45
See application file for complete search history.

(56) References Cited

U.S. PATENT DOCUMENTS

| | | | |
|---|---|---|---|
| 5,804,720 A * | 9/1998 | Morimasa | G01F 1/6845 73/202.5 |
| 5,880,366 A * | 3/1999 | Yamaguchi | G01F 1/692 73/204.26 |
| 11,385,086 B2 * | 7/2022 | Nelson | G01F 15/02 |

FOREIGN PATENT DOCUMENTS

CN 1795369 A * 6/2006 .............. G01F 1/00

OTHER PUBLICATIONS

Wang et al., CN 1795369 A, "Flow Sensor Signal Conversion", Date published: Jun. 28, 2006 (Year: 2006).*

* cited by examiner

*Primary Examiner* — John H Le
(74) *Attorney, Agent, or Firm* — Francis Law Group

(57) ABSTRACT

A system, method, and apparatus for liquid flow sensing and measurement with real-time, dynamic, fluid-configurable computing portion as a software-defined sensor system (SDSS). One embodiment detachably partitions liquid flow meter into a sensing portion and a computing portion, each of the two portions having their own memory. Information directly related to physical and operational properties of the sensing portion, i.e., calibration, is stored locally in memory of sensing portion, and accessible by the computing portion. Configuration information for computing portion in particular applications of the flow meter, e.g., fluid characteristics for viscosity calculation, is stored locally in computing portion memory. Dividing information into two memories allows sensing portion and computing portion of a flowmeter to be replaceable at their subcomponent level with a standard or single stock unit sensing portion calibrated to a standard condition and a single stock unit computing portion configurable to a plurality of fluid types and operating temperatures without additional calibration.

10 Claims, 6 Drawing Sheets

METHOD FOR MANAGING INFORMATION IN LIQUID VELOCITY MEASUREMENT

CROSS-REFERENCE TO RELATED APPLICATIONS

This application claims priority to provisional application(s): Ser. No. 63291947 filed Dec. 20, 2021, titled "METHOD FOR MANAGING INFORMATION IN FLUID VELOCITY MEASUREMENT", the disclosure of which is incorporated by reference herein in its entireties. Furthermore, where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

The present invention(s) relate generally to liquid flow measurement devices. More particularly, the invention(s) relate to apparatus, methods, and systems for storing and processing information between a liquid flow sensing portion of the device for measuring the velocity of a liquid flow (which may be detachable) and a computing portion of the device for converting the velocity measurements to standard measurement units, such as gallons per minute.

BACKGROUND

Liquid flow meters are typically manufactured to specifications to yield consistent measurement results across multiple flow meters in mass production. However, manufacturing tolerances inevitably lead to variations in measurement results from one flow meter to another. In order to negate these variations, flow meters are calibrated to a flow standard. For flow meters based on a velocity measurement of the liquid passing through the flow meter, this calibration is performed at a specific liquid viscosity, since the viscosity affects the velocity at which the liquid will flow through a given passageway. Consequently, if using a flow meter (without adjustment) to measure a liquid having a viscosity other than the specific viscosity at which it was calibrated, some degree of measurement error will occur.

Varying operating conditions of a system, such as the specific type of liquid being employed, and the operating temperature of the liquid, may affect the liquid viscosity, most notably for liquids other than water. Thus when being deployed to varying equipment and processes, flow meters that might otherwise be identical are often differentiated only by specific part numbers for specific calibrations for specific viscosities. This can be particularly troublesome for an original equipment manufacturer (OEM) in the production of various equipment intended to run various processes under various condition, and utilizing liquid flow meters as a component part or the equipment. However, multiple unique flow meters, differing only in their calibration, and thus requiring multiple inventory part numbers, must be kept on hand. Furthermore, if the flow meter is utilized in a process where the liquid temperature can vary significantly during the normal course of operation, thus causing a corresponding variation in the viscosity of the liquid, the flow meter output may be significantly in error at certain liquid temperatures.

The information obtained in the calibration process performed by the flow meter manufacturer is typically stored in the memory of a computing portion of the flow meter, for use in converting the velocity measurements from a sensing portion of the flow meter to standard measurement values. Once calibrated, the sensing and computing portions of the flow meter, even if detachable, must remain paired together to produce correct standard measurement values, since the calibration information is specific to the sensing portion, but is stored in the computing portion.

SUMMARY

Disclosed in the specification is an apparatus, method and system relating to liquid flow sensing and measurement. In one embodiment, a liquid flow meter is detachably partitioned into a sensing portion (or sensor apparatus) and a computing portion (or computing apparatus), with each of the two portions having its own respective memory. For example, one embodiment is essentially a bifurcated memory for storing different types of data for the flow meter, e.g., hardware calibration of the sensing apparatus results stored with the sensor memory, and general fluid characteristics stored in the computing memory. Information specific to the physical and operational properties of the sensing portion, i.e., calibration information, and information pertaining to the effect of changing viscosity of the liquid affecting the velocity of the liquid passing through the sensing portion, is determined by the manufacturer of the flow meter, and permanently stored in the memory of the sensing portion, which can be accessed by a processor disposed within the computing portion. Information related to the configuration of the computing portion for a particular application of the flow meter, i.e., known properties of the type of standard, or even specialty liquids being used, is selected by a second party during the deployment of the flow meter for a particular application, and stored in the configurable memory of the computing portion. This division, or segregation, of information into two separate memories allows for the sensing portion and the computing portion to be swapped interchangeably with like-sensing and like-computing portions, respectively, during deployment of the flow meter, without the information specific to the physical and operational properties of the sensing portion being disassociated or lost from the sensing portion.

The sensing portion may also provide a measurement of the liquid temperature to the computing portion. The computing portion may utilize this temperature information, in conjunction with the information pertaining to the known properties of the type of liquid being used, i.e., the effect of changing temperature on the viscosity of the particular type of liquid, and the information from the sensing portion pertaining to the effect of changing viscosity of the liquid on the velocity of the liquid passing through the sensing portion, to compute a flow rate to be expressed in standard engineering units, such as gallons per minute.

Resultantly, a single stock keeping unit (SKU) for each of the sensing portion and the computing portion of a liquid flow meter, respectively, can be stocked in the inventory of an OEM, and can be interchanged, and readily configured for a variety of applications from original builds to replacements of either sensing portion or computing portion for preventative maintenance or intermittent failure. A single common configuration of hardware and memory of a sensing portion, e.g., SKU, may be utilized in a wide variety of applications of different liquid types, and different liquid operating temperatures (e.g., temperature ranges), as a standard part without concern as to interoperability with the computing portion, or uncertainty of the accuracy of the flow meter's liquid flow measurement. Similarly, a single common hardware, memory and programming configuration of a computing portion can be utilized in a wide variety of applications of different liquid types, and liquid operating temperatures through a simple means of configuring the memory of the computing portion with the information pertaining to the known properties of the type of liquid being used. The configuration of the computing portion may also include information pertaining to the physical interface of the flow meter to other equipment. This configuration of the common computing portion may be executed at the time the flow meter is deployed for a particular application, for example when installed on a piece of equipment in a manufacturing environment, or replaced on a piece of equipment in a field service scenario. For example, if three common category (orifices, pipe size, etc.) flow meters having a common 1" inlet and outlet pipe thread and ¼" orifice need replacing, then three of the SKUs for that category can be retrieved and installed directly and start operation, despite their applications having no commonality in fluid to be measure, e.g., oil, water, and coolant, or a wide variety of fluids are possible, and having no commonality in temperature ranges of operation, e.g., 0-50° F., 50-90° F., and 90-140° F., though a wide variety of temperature ranges are possible. Only the computing portion has to be loaded with configurable data of the liquid characteristics of oil, water, and coolant at the temperature ranges, e.g., 0-50° F., 50-90° F., and 90-140° F. respectively, in order for the combined sensor portion and computing portion to operate accurately.

Furthermore, the computing portion of the liquid flow meter may be individually provided for an individual sensing portion, or may be collectively provided for multiple sensing portions. A computing portion, thus shared with more than one sensing portion, would provide a separate configuration memory for each specific sensor portion. In the latter case, a single shared computing memory may be divided into multiple configuration memory segments, one for each of the sensing portions, with specific locations of the single memory allocated for each sensing portion, and selectively accessed by the processor. In this scenario, a single computing portion (with sufficient memory) of a sensor system is assigned to a sophisticated work station that has multiple flow meters (sensing portions), e.g., a 1:N ratio, where each of the flow meters are either differently sized, differently deployed for different temperature ranges (e.g., for a heating line and a cooling line to regulate temperature), uniquely calibrated, and even differently slated to different types of liquids used at the work station (e.g., a coolant and a lubricant mediums). Alternatively, a single computing portion of a sensor system can also be paired with a single sensor portion in a discrete 1:1 relationship. In these scenarios, if a sensing portion of a flowmeter fails, a single stock keeping unit of a same form factor or same class/category of flowmeter, albeit with its own unique calibration, is simply swapped out with the failed flowmeter. The computing portion simply reads the new calibration data (at a standard condition, e.g., of water at room temperature) from the new flow meter sensor portion of the sensor system, and applies the given temperature reading, and the given fluid characteristics, which are the same for the given application, e.g., a lubricant, to achieve an end result of an accurate temperature-compensated and fluid-type compensated flow measurement. The replacement sensor apparatus is operational in a matter of minutes required for physical installation. This is superior to conventional replacement that might require a new sensor unique to the operating conditions be ordered if out of stock and then manually calibrated to the operating environment. Instead the present disclosure pairs i) a sensing portion of a sensor system with its locally stored calibration data, e.g., local to the sensor element, that commonly applies to different temperature ranges and different fluids, and its ability to transmit a current temperature of the liquid to ii) a computing portion of a sensor system, with its locally stored specification-type fluidic data that is specifically selected or loaded for a given application of different temperature ranges and different fluids, the result is an ability of the computing portion of the sensor system to flexibly and accurately compute an end result of an adjusted flow rate for said liquid type at said current operating temperature. The present disclosure provides a quick and easy plug-and-play sensing portion and computing portion of a sensor system with numerous apparent and hidden benefits.

This summary is provided to introduce a selection of concepts in a simplified form that are further described below in the detailed description section. This summary is not intended to identify key or essential features of the claimed subject matter, nor is it intended to be used as an aid in determining the scope of the claimed subject matter.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense.

BRIEF DESCRIPTION OF THE VIEW OF DRAWINGS

Example embodiments are described by way of illustrations and are not limited by the figures of the accompanying drawings, wherein.

Figure 1:
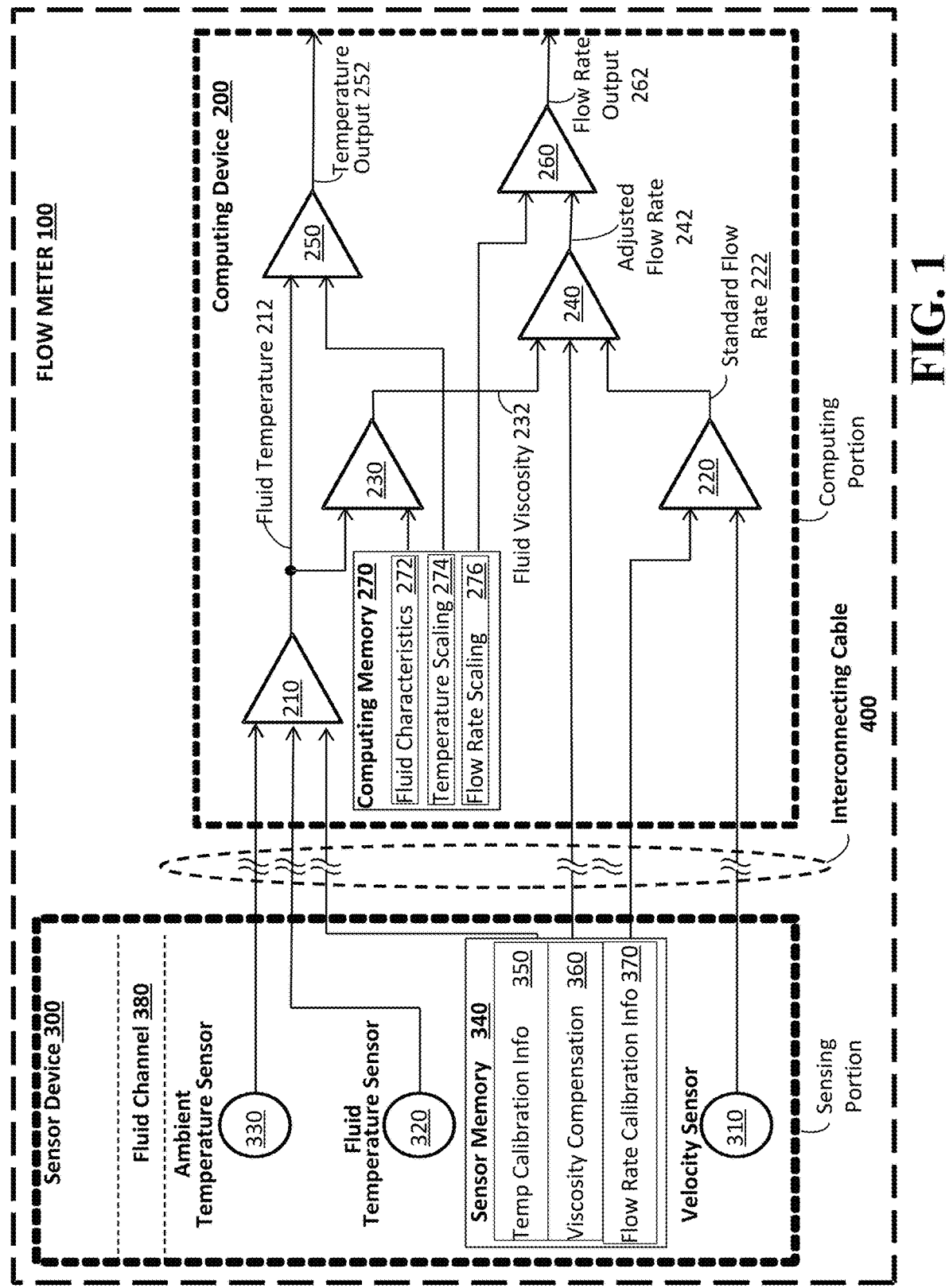
FIG. 1 is a functional diagram of a liquid flow meter employing the measurement of liquid velocity as the basis for determining a flow rate, and having a sensing portion detachably coupled to a computing portion, according to one or more embodiments.

The drawings referred to in this description should be understood as not being drawn to scale, except if specifically noted, in order to show more clearly the details of the present disclosure. Same reference numbers in the drawings indicate like portions throughout the several views. Other features and advantages of the present disclosure will be apparent from accompanying drawings and from the detailed description that follows.

DETAILED DESCRIPTION

A method, apparatus and system is disclosed relating to liquid flow sensing and measurement. In the following description, for the purposes of explanation, numerous specific details are set forth in order to provide a thorough understanding of the various embodiments. It will be evident, however to one skilled in the art that various embodiments may be practiced without these specific details.

Referring to FIG. 1, a functional diagram is shown of a liquid flow meter (aka sensor system) 100 that is comprised of i) a sensing portion 300 (aka a sensor apparatus or device) employing the measurement of liquid velocity as the basis for determining a flow rate; the flow meter detachably coupled to ii) a computing portion 200 (aka a computing apparatus or device), according to one or more embodiments. Specifically, the functional diagram shows the locations and relationships of multiple types of information derived from physical sensors, calibration information, compensating information, and configuration information, that are used in various portions of the sensor system 100, e.g., in either the liquid flow meter (sensing portion) 300 that is detachably coupled, via interconnecting cable 400 to the computing portion 200, according to one or more embodiments. As used in this description, a flow meter is not a conventional single line-replaceable integrated unit of both sensing and computing and displaying and/or outputting of a flow rate, that is a unique part for a given form factor (pipe size), fluid type, temperature range, and unique calibration data. Rather, flow meter 300, as used herein, is a line replaceable or interchangeable unit (LRU or LIU) and interchangeable portion of the overall sensor system that provides raw unprocessed, unformatted, uncompensated velocity information for a liquid as part of said overall sensor system 100.

The sensing portion 300 is specifically comprised of a flow channel 380, a liquid velocity sensor 310 that measures the velocity of a liquid passing through the flow channel 380, a liquid temperature sensor 320, an ambient temperature sensor 330, and a sensor memory 340. The sensing portion 300 and computing portion 200 may be integrated into a single physical unit, but in this particular embodiment is physically separated by an interconnecting cable 400 to isolate the computing portion 200 from extreme temperatures of the liquid passing through the flow channel 380. The interconnecting cable 400 may be fixed or detachable. Alternatively, a wireless or optical interface can be used to communicate information between sensing portion 300 and computing portion 200. The connections depicted throughout the diagram may represent physical couplings, as in the case of hard-wired connections of the velocity sensor 310, fluid (or liquid) temperature sensor 320, and ambient temperature sensor 330 passing through the interconnecting cable 400. Alternatively, connections may depict virtual coupling, as in the case of liquid temperature information, exchanged between the temperature operating function 210 and the viscosity function 230 by firmware executing on the computing portion 300. Alternatively, connections may depict a combination of physical and virtual coupling, as in the case of viscosity compensation information 360 transferred in a serial bitwise manner over the interconnecting cable 400 from the sensor memory 340 to the adjusted flow rate operating function 240.

In the manufacture of the flow meter 300, variations in the liquid velocity measurement between one particular sensing portion and another, typically arise due to factors such as dimensional variations of the liquid channel 380 and other portions of the sensing device 300, and variations in the response characteristics of the particular velocity sensor 310. These variations may necessitate the performance of an individual calibration of each sensing portion 300 at the time of manufacture, wherein the measurements from the sensing portion 300 are correlated to known flow rates obtained from a reference flow meter.

If a conventional product were to store calibration information in single memory also used in converting the output signals from a sensor portion to standard flow measurement units, then the integral flow meter would permanently store its own unique calibration information as a whole unit and would have to be replaced instead of a portion thereof. Thus, in one embodiment, if the calibration information is stored in computing memory 270 (not shown) on the computing device 200 at the time of manufacture, and the sensing portion 300 is subsequently separated from the computing portion 200 by removal of the interconnecting cable 400, the two devices must nonetheless remain paired together as a set, even while not physically connected, because the calibration information in the in memory of the computing portion 200 reflects the particular physical characteristics of the now separated sensing portion 300. Therefore, the exact same two portions must be reconnected in order to maintain the desired measurement output. Hence, the two portions effectively become entangled at the time the flow meter 100 is calibrated, and remain entangled even when physically separated, since the calibration information that is specific to the sensing portion 300 is stored in the memory of the computing portion 200. Alternatively, the computing portion 200 can be removed from an application and paired with a different sensor portion 300 and then recalibrated as a pair and reintroduced to an application. However, this undesirable embodiment results in long downtimes and costly one-off calibration.

In the current disclosure, the entanglement between the sensing portion 300 and computing portion 200 of conventional units is avoided by storing the flow rate calibration information 370 in a sensor memory 340, disposed on the sensing portion 300, to which the computing portion 200 has access by means of the interconnecting cable 400. Then the sensing portion 300 and computing portion 200 no longer need to be paired together from the time of calibration, because the flow rate calibration information 370 that is unique to the sensing portion 300 always remains with the sensing portion 300, and either portion can be exchanged at any time with a like portion. In other words, a sensing portion 300 can be replaced, for example for service or maintenance purposes, without replacing the computing portion 200, and vise-versa. The vice-versa likewise works because the computing portion 200 can be replaced with a new computing portion configured for the fluid characteristics 272 specific to the application. All the other values for the sensing portion flow meter 300 are communicated at a time of operation of the sensor apparatus flow meter 300 coupled to the computing device 200 via interconnecting cable 400. This disentanglement is also desirable when the sensor system flowmeter 100 is used as a component part of mass-produced equipment, because the manufacturing process for the equipment does not require the two portions to be handled as a paired set, thus simplifying the manufacturing process.

The stored flow rate calibration information 370 is usually subject to the particular viscosity of the liquid at the time of the calibration, which is effected by the temperature at which the calibration was performed. So subsequently, in actual application of the flow meter 100, changes in liquid viscosity due to the use of different types of liquid and changes in liquid temperature may affect the certainty of the conversion of the measured liquid velocity to the standard flow measurement units.

In applications where differing liquids are used and/or the liquid temperature may change significantly during normal operation of the flow meter 100, it can be useful to determine the viscosity of the liquid at any given time, so that the conversion of the measured liquid velocity to the standard condition of flow measurement units can be adjusted for changes in the liquid viscosity. A viscosity sensor can physically measure the viscosity of the liquid, but the inclusion of a viscosity sensor may not always be practical or affordable in certain applications. In the present embodiment, a viscosity sensor is not required to determine a viscosity of a liquid medium being measured. So as an alternative, the viscosity of the liquid may be ascertained by measuring the temperature of the liquid, and correlating this temperature measurement to known characteristics of the liquid being used at the measured temperature. That is, the effect of temperature on the particular liquid characteristics 272, which may be expressed in a look up table (LUT) of liquid temperatures versus liquid viscosity, or as a mathematical equation, either of which is stored in computing memory 270.

As further shown in FIG. 1, two temperature sensors are employed on the sensor portion 300 a fluid, or liquid, temperature sensor 320 and an optional ambient temperature sensor 330. The inclusion of the ambient temperature sensor 330 allows for the effects of ambient air temperature on the liquid temperature sensor 320 to be computationally negated. The two temperature sensors are coupled to a temperature function 210 within the computing portion 200, which calculates a liquid temperature 212. An optional temperature calibration may be performed at the time the flow meter 100 is manufactured, to improve the uncertainty of the temperature calculation; with temperature calibration information 350 stored in the sensor memory 340 and coupled to the temperature function 210 for adjusting the resulting fluid temperature 212.

The flow rate calibration information 370, stored in the sensor memory 340 is coupled to a flow rate function 220 within the computing device 200, along with the measurement from the liquid velocity sensor 310. From this, the flow rate function 220 determines a flow rate for a standard liquid viscosity condition 222. The flow rate calibration information is typically for calibration of the sensing portion 300 that is performed with the standard liquid viscosity condition of one centistokes. The resulting standard flow rate 222 may be used directly as the output of the flow meter 100, if the operating liquid will always remain at the same standard viscosity as at the point of calibration.

But if the operating liquid will be at a different and potentially variable viscosity than at the one centistokes point of calibration, an adjusted flow rate 242 output can be computed by a viscosity adjustment function 240, derived from the inputs of the flow rate one centistokes 222, viscosity calibration information 360 from the sensor memory 340, and a known liquid, or fluid, viscosity 232 at any given time and condition of operation. The velocity calibration information 360 is derived by the manufacturer of the sensor device 300 from a set of flow rate calibrations performed at one or more liquid viscosities, whereby the effect of varying liquid viscosity on the standard flow rate 222 is determined. The liquid viscosity 232 is derived by a viscosity lookup or calculation function 230 (calculated or derived from LUT closest match or interpolation), which uses the liquid temperature 212 and liquid characteristics information 272 from the computing memory 270 to determine the viscosity at any particular time and condition of operation. The liquid characteristics information 272 may take the form of either a table of liquid temperature versus liquid viscosity for the particular liquid being used, or a mathematical formula that reflects the relationship of the liquid viscosity 232 to the liquid temperature 212 for the particular liquid being used. The output of the viscosity adjustment function 240 is an adjusted flow rate 242, which accurately reflects the flow rate in standard units of measure over a range of operating liquid temperatures and viscosities.

If the flow rate output 262 is expressed as an analog voltage, a flow output scaling function 260 can convert the range of the adjusted flow rate 242 values to the desired output voltage range, based on a flow rate scaling 276 factor stored in the computing memory 270. For example, a flow meter sensor system 100 with a measurement range of 0.5 to 5.0 gallons per minute might have its output scaled to provide a 0.5 to 5.0 volt range, with one volt representing one gallon per minute. Alternatively, a flow meter sensor system 100 with a measurement range of 3.0 to 30 liters per minute might be scaled to provide a 1.0 to 10 volt output range, where 1.0 volts represents 3.0 liters per minute, and 10 volts represents 30 liters per minute. Likewise, when the liquid temperature is to be communicated outside the flow meter 100, a temperature scaling function 250 can convert the range of the liquid temperature 212 values to a desired voltage range, based on a temperature-scaling factor 274.

Similarly, for a flow meter 100 with an output expressed as a digital number, the flow output scaling function 260 could employ the flow rate scaling 276 to select the units of measure to be expressed by the digital output. For example, a flow rate scaling 276 value of zero might select gallons per minute as the units of measure for the digital output, and a value of one might select liters per minute.

Application:

For applications using the flow meter 100, for example by an OEM as a component part of a piece of industrial (semiconductor) equipment, the current disclosure simplifies the process for manufacturing the equipment, as well as simplifying the maintenance of said equipment in the field, particularly where various configurations of the equipment have differing liquid temperature, type of liquid usage, and meter configuration requirements. In such cases, the manufacturing and field servicing processes may need to stock only one version of the sensing portion 300, which has its memory 340, configured by the manufacturer of the sensing portion 300 with its specific calibration information, and a single version of the computing portion 200, which may have its memory configured at the time of installation on the industrial equipment, with information defining the specific operating requirements 276 and type of liquid 272 to be used for the particular piece of equipment. Furthermore, no pairing of sensing and computing devices is required. Thus when the sensing device 300 is to be installed on the equipment in the manufacturing or field service environment, any sensing device 300 may be selected from inventory without regard to any particular computing device 200 that is to be installed, or may already be installed. In addition, the inverse holds true for the computing device 200 as well, in that it may be installed without regard to any particular sensing device 300.

A typical conventional flow meter 100 may employ a small human readable alphanumerical or graphical display and a few simple keys by which the configuration of the flow meter 100 for a particular application may be accomplished by hand. However, in the present disclosure, the scope of information such as the liquid characteristics 272 may be too extensive to be reliably and accurately entered into the computing memory 270 by human operation. The configuration for a particular application could be loaded onto the computing portion 200 by the manufacturer of the flow meter 100 at the time of manufacture, but this would tie the flow meter 100 to one particular application, defeating the objective of stocking a common computing portion 200 that can be configured on deployment to various applications. Therefore, various means of entering configuration information into the computing portion 300 in a mechanized or electronically controlled manner is desirable.

Referring still to FIG. 1, sensor apparatus 300 measures a physical property, e.g., a liquid flow rate, of a medium, e.g., coolant, oil lubricant, etc. Sensor apparatus 300 comprises i) sensor element 310, 320, or 330 (velocity and temperatures, respectively) for measuring the physical property; and ii) sensor memory 340. Sensor memory 340 stores calibration data 370 specific to the sensor element as calibrated to a standard condition, e.g., of water at room temperature. Sensor memory 340 is disposed locally to sensor element 310 because data retained on sensor memory 340 is specifically tied to sensor element 310. The primary sensor element in the present embodiment is 310 velocity sensor, which is used to calculate a flow rate of liquid through fluid channel 380. Calibration data 370 can include an offset (to obtain a zero flow rate) and a gain (to match an actual flow rate to a calibrated meter). The calibration can be linear or non-linear depending on the application and the need for granularity and accuracy. Notably, sensor apparatus 300 is not calibrated to the specifically destined operating conditions, e.g., specific fluid and specific temperature range(s), like conventional sensors—it is only calibrated to the standard condition in the present embodiment. An exception exists for operating fluid equivalent to the standard condition, e.g., water. Other calibration data can be stored in sensor memory 340 for the sensor apparatus 300, but it is not required if beyond the standard condition, for sensor apparatus to operate in the actual operating conditions for the designated application. If a conventional sensor element is calibrated at a plurality of fluids and temperatures with data stored locally for flexibility in different potential operating conditions of different applications, then the cost in time and capital equipment would be excessive and unnecessary in view of the present disclosure.

Sensor apparatus 300 does not require a processor (e.g., a microprocessor or microcontroller, etc.) to be disposed with the sensor apparatus 300 itself, in order for the sensor apparatus to function or operate in an actual operating condition of a designated application. Said differently, all processing of data to yield a adjusted flow rate output 242 or flow rate output 262, and a temperature output 252 is external to sensor apparatus 300. Thus, sensor apparatus 300 is not a standalone unit for providing a final fluid flow. However, it is a standalone unit for providing its intended function of a key measurement of liquid velocity and of a supporting measurement of temperature(s) (that could alternatively come from other sources), and intended function of storing one or more key calibration and compensation data. The tradeoff in making sensor apparatus stand-alone for its intended function is that it is a lowest cost replaceable unit that avoids a cost of scrapping an integrated computing device. Additionally, the stand-alone feature of the sensor apparatus 300, with its remote capability via interconnecting cable 400, means that the manufacturing costs can be controlled for the different environments of the sensor device 300 and computing device 200. As an example, if a flow meter sensor is disposed in an extreme environment, e.g., one or more temperature extremes or excessive temperature cycling, or high acidity or reactive fluid, then only the sensor apparatus requires the expensive design and construction to withstand said extreme environment, while the computing unit, which is remote from the extreme environment, is manufactured with more cost effective conventional techniques.

While the present embodiment involves fluid measurement and more specifically a liquid medium, the present disclosure is applicable to a wide variety of materials or mediums (gas, solid, liquids, etc.) for any physical property to be measured (temperature, pressure, flow rate, etc.) that can utilize a calibration of the sensor apparatus at some standard condition while the sensor apparatus itself is exposed to operating conditions other than the standard condition.

Sensor apparatus 300 stores in sensor memory 340, viscosity compensation data for the sensor apparatus 300 that is agnostic for at least one of a temperature and of a fluid type. Agnostic means that the viscosity compensation is approximately the same for multiple traditional temperature operating ranges (e.g., 0-100° F., or −20 to 80° F., etc.) and for multiple conventional fluids (solvents, coolants, lubricants, water, etc.) This is because viscosity compensation data is based on a given form factor of sensor apparatus 300 in the present embodiment, e.g., the pipe size, inlet and outlet configurations, orifice sizes, and other internal flow channel geometries and sizes. Said differently, the viscosity compensation data is orthogonal and independent of a flow calibration. Thus, for a given class or category of sensor apparatus that has similar properties, the viscosity compensation is a universal value, despite sensor elements in each of the plurality of different sensor apparatus do not have or require a same calibration value for the standard condition.

Viscosity compensation data could thus, in a different embodiment, even be stored external to sensor apparatus 300, e.g., stored on computing memory 270 and then simply accepted by a user if the other operating conditions remain constant for a sensor apparatus 300 replacement in an application. Alternatively, if a change in the operating environment arises, then a different viscosity compensation data could be selected, confirmed, overridden, or uploaded to the computing memory 270. Again, the more important value of flow rate calibration that is uniquely associated with a given sensor apparatus 300 is always stored local to an appropriate sensor element 310 for which it is calibrated, e.g., liquid flow rate at the standard condition.

Sensor memory 340 itself is independent from the sensor element because both items communicate their respective data separately, independently, and uncoupled from the sensor device 300 to the computing device 200. Sensor element 310 for velocity does not utilize sensor memory 340 in the present embodiment. Sensor memory 340 stores less than, or only a portion of, all data required to operate the sensor element in the actual operating conditions of the designated application, in the present embodiment. This is why the sensor apparatus 300 is not fully functional to provide a sensor measurement as a flow rate by itself—it needs the computing apparatus for the latter function.

Figure 2:
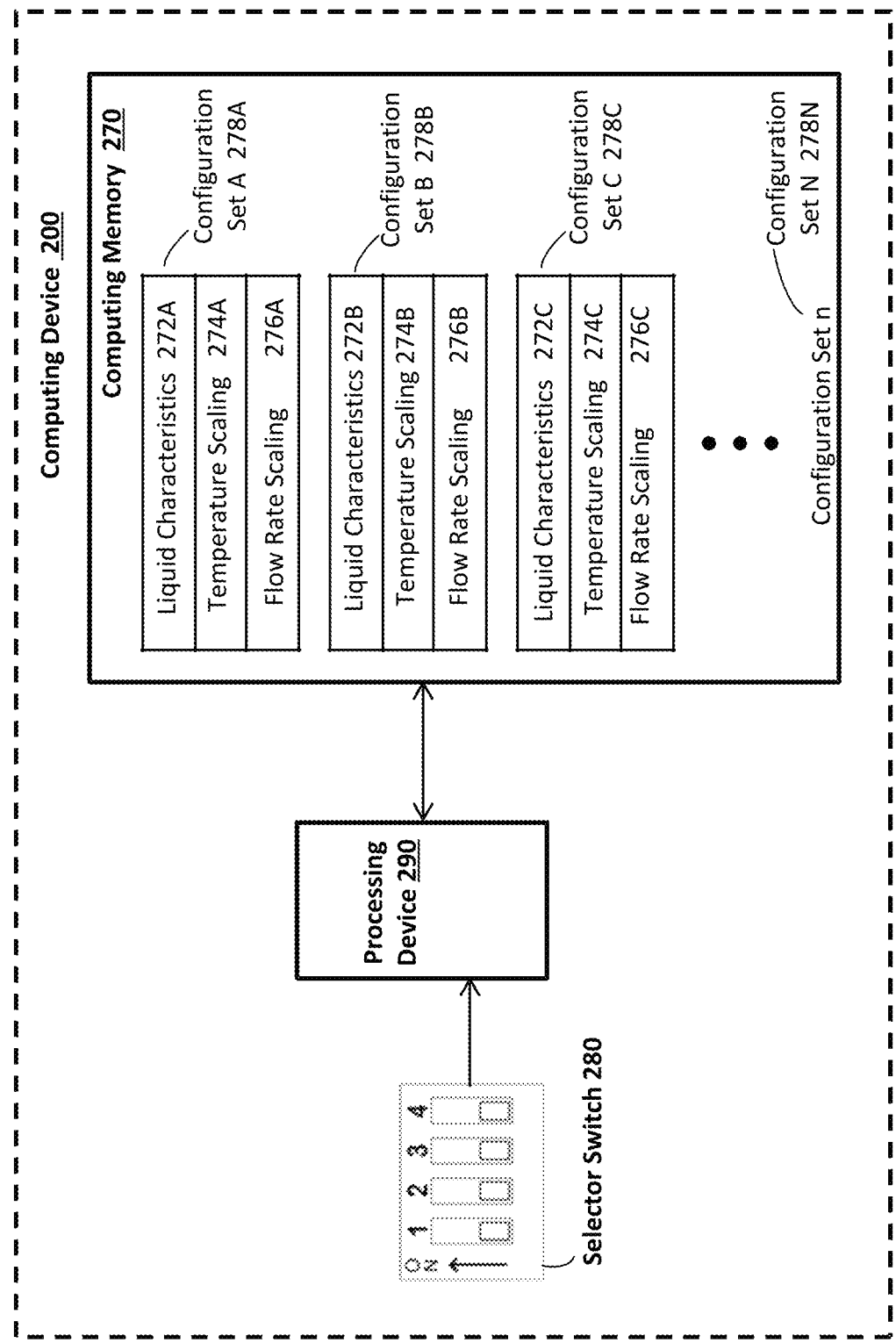
FIG. 2 is a partial diagram of the computing portion of the liquid flow meter with a switch for selecting appropriate configuration information set for a particular application.

Referring to FIG. 2, one embodiment is shown of a mechanized means where a binary selector switch 280 is used to select one of multiple applications configuration sets 278A, 278B, etc., which have been preloaded into the computing memory 270. The multiple application configuration sets 278A, 278B, etc. can, for example, be loaded into the computing memory 270 per the OEM requirements by the manufacturer of the flow meter 100 at the time the flow meter 100 is manufactured. The binary selector switch 280 may be directly connected to the computing memory 270 to affect the addressing of separate memory segments for each configuration set 278A, 278B, etc., or as shown in FIG. 2 may be indirectly coupled and read by a processing device 290 within the computing portion 200 and interpreted for the selection of one of the application configuration sets 278A, 278B, etc.

Figure 3:
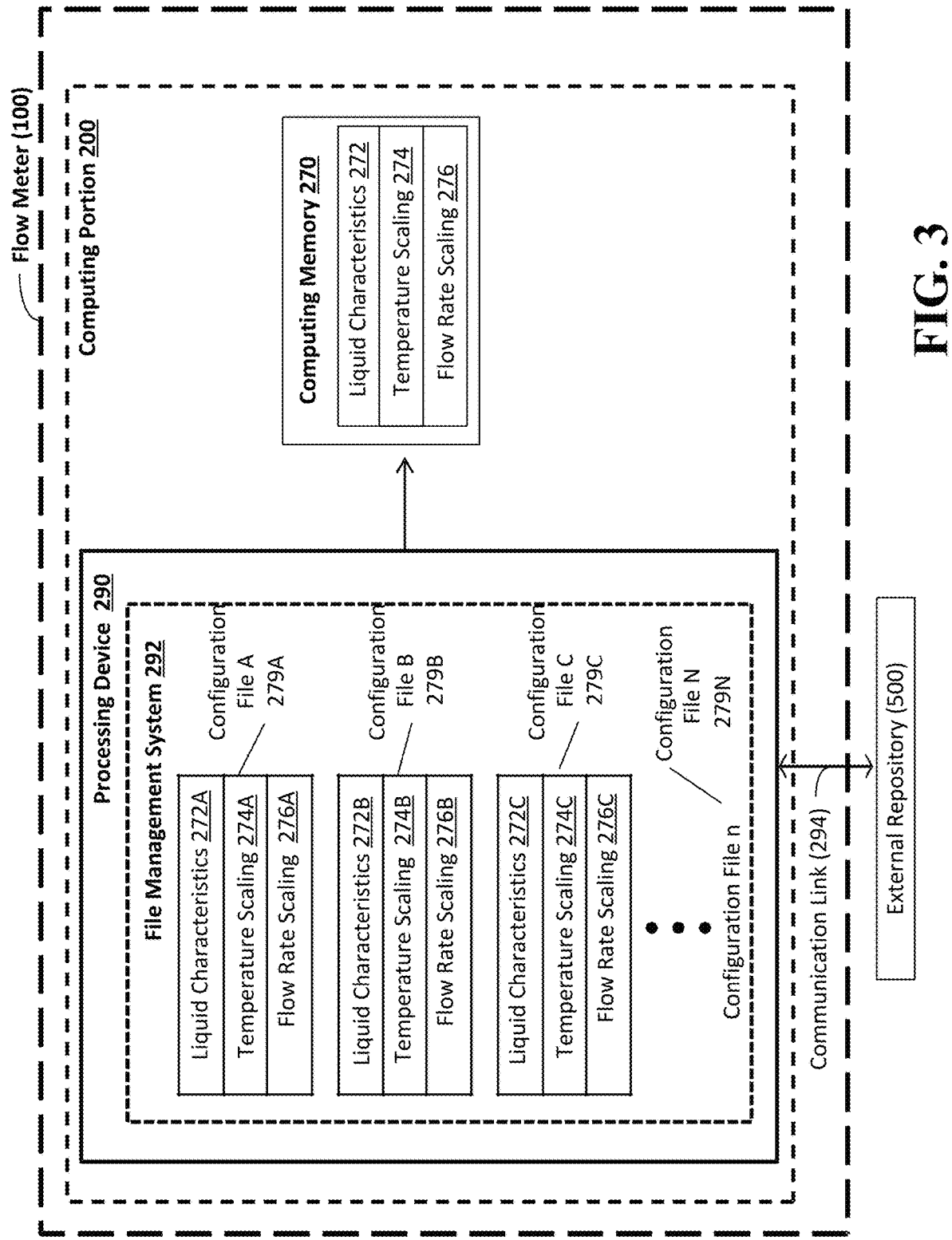
FIG. 3 is a partial diagram of the computing portion of the liquid flow meter with an embedded file management system to select between multiple configuration files for particular applications.

In another embodiment, shown in FIG. 3, the computing portion 200 may incorporate a file management system 292, executed as a firmware function of the processing device 290, by which application configuration sets are encoded into individual configuration files 279A, 279B, etc., any one of which may be selected for the appropriate application, and loaded into the computing memory 270 on deployment of the computing portion 270 for a particular application. The configuration files 279A, 279B, etc. can be loaded into the file management system 292 per the OEM requirements by the manufacturer of the flow meter 100 at the time the flow meter 100 is manufactured. Configuration files may alternately be loaded by the OEM by means of a communication link 294, such as USB or Bluetooth, to an external repository 500 of configuration files. However, any such implementation of a file management system 292 may require more memory and computing resources than are typically available within the computing portion 270, and may ideally require a more extensive human interface than typically provided on flow meters in general.

Figure 4:
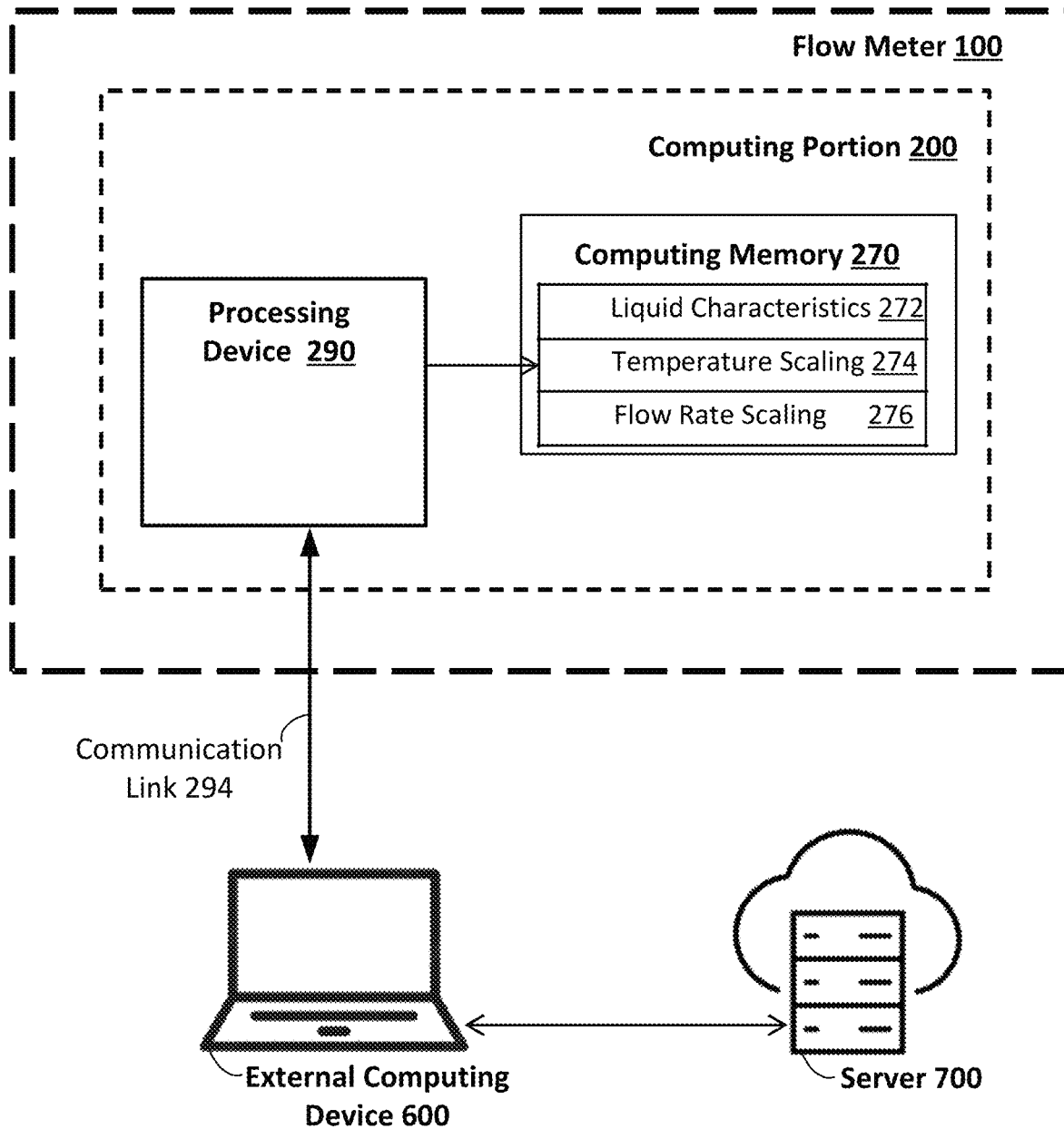
FIG. 4 is a partial diagram of the computing portion of the liquid flow meter with an interface to an external file management system with cloud server access.

Referring now to FIG. 4, the file management system is moved outside the flow meter, into an external, or mobile, computing device 600 such as a laptop computer or tablet computer having greater computing, memory, and human interface capabilities. Thus, a library of configuration files can be readily maintained on the external computing device 600, and only the one specific configuration file needed for a particular application of the computing portion 200 need be loaded into the computing memory 270 at the time the flow meter is being deployed. The required application file can be loaded into the computing memory by a communications link 294 between the processing device 290 and the external computing device 600.

Still Referring to FIG. 4, the capability of the file management is further expanded to accommodate the configuration of computing portions 200 at multiple locations. Here, a master copy of the configuration file library is maintained on a server 700 that is accessible by a plurality of external computing devices 600 deployed to multiple locations for likely different applications in different industries. The server may even be in the cloud for global access. This allows a common configuration library to be accessed at more than one manufacturing location or by field service personnel when it becomes necessary to replace a computing portion 200 in the field. Server 700 also allows for universal updates to multiple locations via external computing devices 600, or in an automated fashion by WiFi coupling of computing device to server 700, as an Internet of Things (IoT) implementation.

Figure 5:
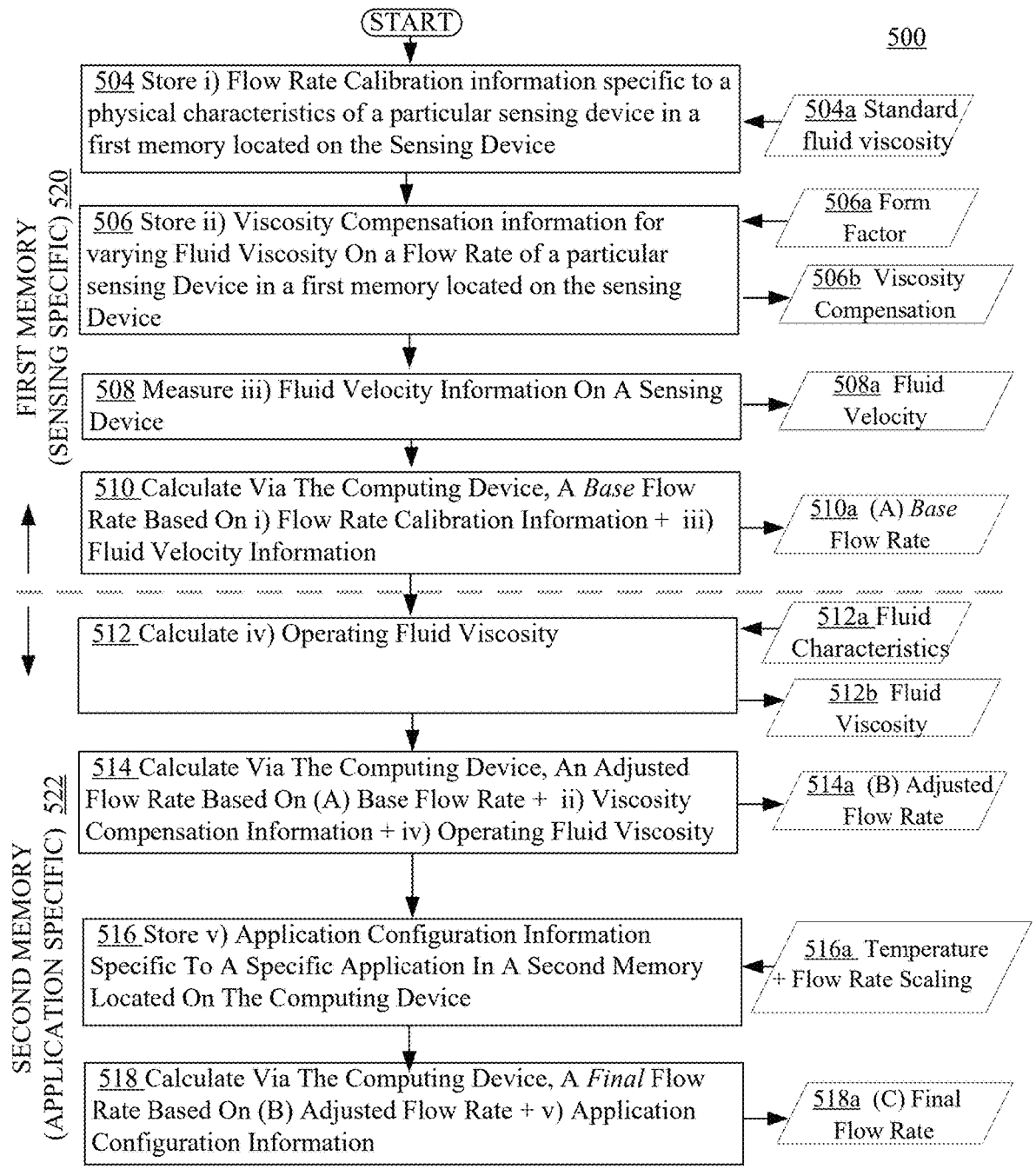
FIG. 5 is a flowchart diagram for operating a two-part sensor system as a sensing device and a computing device, in accordance with one or more embodiments.

Operation:

Referring now to FIG. 5, a flowchart is illustrated for operating a two-part sensor system flowmeter 100 as a sensing device 300 and a computing device 200, with embodiments in FIGS. 1-4. In one embodiment, a method is described for storing, managing and processing information in a liquid flow meter 100 having a sensing portion 300 that is detachably coupled via interconnects 400 in communication to a computing portion 200. In a first operation 504, flow rate calibration information 370 at a standard condition of fluid type, temperature (or viscosity) 504a, which is specific to the physical characteristics of the particular sensing portion 300, is stored in a first memory 340 located on sensing portion 300. In a second operation 506, viscosity compensation information for a sensor device is output 506b based on a given form factor of device as input 506a, e.g., as shown in FIG. 1 with viscosity compensation information 360 stored in a first memory 340 located on sensing portion 300 of flowmeter 100. Alternatively, viscosity compensation information 360 can be stored external to sensor memory 340, e.g., on the computation memory 370, especially if the sensor apparatus class is consistent for the application. These first two operations are typically performed by a manufacturer of a flow meter 100 or of sensing portion 300 at time of manufacture to a standard condition. Alternatively, this information can be updated in sensor memory by preventative maintenance (PM) recalibration at any time. In operation 508, liquid velocity information is output as 508a, as shown in FIG. 1 by velocity sensor 310 measurement on the sensing portion 300 of flow meter 100 for liquid flowing in flow channel 380, e.g., using a hall effect device, a transducer, etc.

In next operation 510, a (base) flow rate output 510a is calculated as shown in FIG. 1 by computing portion 200 function 220, which calculates a base flow rate 222 based on liquid velocity information 310 and flow rate calibration information 370, both stored in sensor memory 340. Flow rate calibration information 370 is specific to a certain liquid viscosity of the standard condition. A subsequent operation 512 calculates operating fluid viscosity output 512b from fluid characteristics input 512a. Said input is provided or selected by selector switch 280 and processing device 209 of FIG. 2 and/or input from external repository 500 via communication link 294 (or via wireless signal, as serial input, etc.) as shown in FIG. 3. While an operating fluid viscosity for the fluid flow rate (using fluid velocity) being measured by sensor device 300 can be measured itself by an actual viscosity measurement device in one embodiment, this adds cost and complexity. Consequently, the present embodiment calculates operating fluid viscosity from the input of fluid characteristics 512a. This is shown in FIG. 1 by liquid characteristics data 272 in computing memory 270 and computed by function block 230 in computing portion 200 with an input of the operating liquid temperature 330 for completing a lookup in a LUT of viscosity versus temperature for a given fluid type.

In operation 514, an adjusted flow rate output 514a is calculated based on base flow rate (A) and viscosity compensation information 506b and operating fluid viscosity 512b. This is illustrated in FIG. 1 as adjusted flow rate 242 based on (base) flow rate 222, operating liquid viscosity 232, and viscosity compensation information 360. Next, operation 516 stores application configuration information input as 516a for a specific application in a second memory located on the computing device. This is shown in FIG. 1 as optional temperature scaling data 274 and optional flow rate scaling data 276, both stored in computing memory 270. In operation 518, a final flow rate output 518a, item (C), is calculated as shown in FIG. 1 by a flow rate scaling 276 modifies a liquid temperature reading 212 to a desired temperature analog output 252 via functional block 250. Optional flow rate scaling data 276 similarly modifies by functional block 260, an input of adjusted flow rate 242 to a desired flow rate output 262 at a desired voltage range for an analog application.

Operations 504 through 510 roughly correspond to first memory 520 (sensing specific), illustrated as sensor memory 304 disposed in sensing apparatus 300 of FIG. 1. Operations 512 through 518 either read data from first memory 520 (sensing specific) as viscosity calibration information, or store the data in second memory 522 (application specific) as fluid characteristics 512a that are stored therein, and processed to generate operating fluid viscosity 512b.e.g., shown in FIG. 1 as fluid characteristics 272 in computing memory 270 for the liquid in the fluid channel 380 of sensor device 300.

Figure 6:
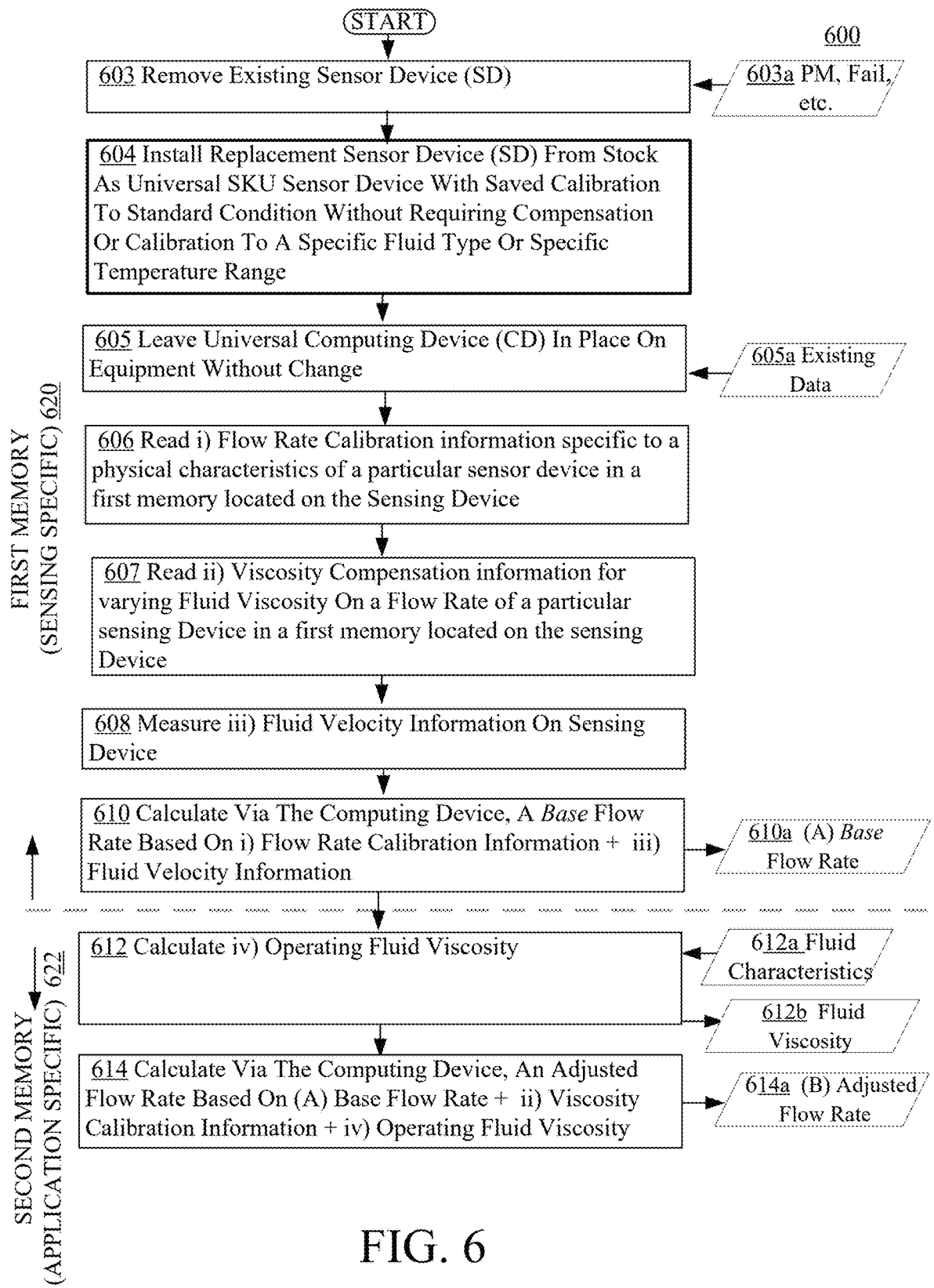
FIG. 6 is a flowchart diagram for replacing sensor device as a line replaceable unit, in accordance with one or more embodiments.

Referring to FIG. 6, a flowchart diagram 600 is shown for replacing sensor device 300 as a line replaceable unit in a sensor system flowmeter 100 disposed in an application, in accordance with one or more embodiments.

First operation 603 removes an existing sensor device (SD), e.g., device 300 from sensor system flowmeter 100 as shown in FIG. 1, from an application, e.g., delivering a liquid to a semiconductor deposition workstation (not shown). The impetus 603a to remove sensor device 300 could be preventative maintenance, a failure of the device itself, a leak in the plumbing, etc. In operation 604, a replacement sensor device is obtained from stock as a universal SKU sensor device with saved calibration to standard condition without requiring compensation or calibration to a specific fluid type or specific temperature range. This is the benefit of the present disclosure, the fact that a sensor device can be obtained primarily based on size and flow range to fit the designated application, rather than on fluid and/or temperature calibration of the sensor device. This feature has advantages over conventional flowmeters calibrated per temperature and fluid by reducing stock inventory substantially, thereby saving cash tied to unused assets, reducing storage space, and by reducing probability of obtaining a wrong part based on wrong temperature or fluid calibration. It also has potential advantages of designing the sensor device to be more robust than the computing device based on the environment that the sensor device is disposed (typically harsher). Operation 605 leaves universal computing device in place on equipment without change, with existing data 605a, such as liquid characteristics 272, temperature scaling 272 and flow rate scaling 276 disposed in computing memory 270, as shown in FIG. 1. This reduces labor, cost, and probably of error in configuring a computing portion of a conventional flowmeter that is an integral assembly of a sensor device and computing device.

Next operation 606 reads a flow rate calibration information specific to physical characteristics of a particular sensor device in a first memory located on the sensing device, e.g., disposed in first memory (sensing specific) 620, as shown in FIG. 1, flow-rate-calibration information 370 disposed in sensor memory 340. Similarly, operation 607 reads viscosity compensation information specific to a class or category of sensor device in a first memory (sensing specific) 620, located on the sensing device, e.g., FIG. 1 illustrates viscosity compensation information 360 disposed in sensor memory 340.

Operations 608 measure fluid velocity, 610 calculate a base flow, 612, calculate operating fluid viscosity, and 614 calculate an adjusted flow rate parallel the operations 508, 510, 512 and 514, whose description is incorporated herein for flowchart 600.

Another method not illustrated is the means of calibrating a sensor apparatus, typically performed by a manufacturer of the sensor apparatus. A first operation to calibrate is to operate the sensor apparatus in a test bench certified for calibration, at a standard condition, namely water fluid at room temperature. Calibration data of offset and gain is then stored as data 370 in a sensor memory 340 specific to sensor apparatus 300 as shown in FIG. 1, which is local to the sensor element 310, thereby reliably tethering the calibration to the sensor element. At no time is a computing device (microprocessor or microcontroller, etc.) required to be disposed in the sensor apparatus. Next, a viscosity compensation data that is agnostic to at least one of a temperature setting or temperature range and of a fluid type is also stored in sensor memory 340. No other data is necessary to be stored in sensor device for it to be functional in a sensor system flowmeter, that joins a computing device 200 therewith, and having a balance of data to operate the sensor device in a wide range of temperatures and operating fluids. At this point, sensor device is ready to be stocked according to its class or category that determined its viscosity compensation data.

Alternatives:

A flowchart illustrating process for providing a flow rate, an adjusted flow rate, a liquid viscosity, and a flow rate output, in accordance with one embodiment of the present disclosure. In one embodiment, the process is carried out, at least in part, by operational amplifiers operating in an analog realm interfacing with data values, references, and/or parameters that are stored in memory. In another embodiment, the process is executed via digital processors and electrical user interface controls under the control of computer readable and computer executable instructions stored on a computer-usable storage medium.

The computer readable and computer executable instructions and other data reside, for example, in data storage features such as computer usable volatile and non-volatile memory and are non-transitory. However, the non-transitory computer readable and computer executable instructions may reside in any type of computer-usable storage medium. In one embodiment, process is performed by one or more devices, components, and illustrations in FIGS. 1-4.

Process may be carried out by a circuit or a plurality of circuits. Process may also have portions offloaded to a computer system. In one embodiment, process is carried out by processors, micro-controllers, memory controllers, logic circuits, and/or electrical components under the control of computer readable and computer executable instructions stored on a non-transitory computer-usable storage medium.

The above advantages are exemplary, and these or other advantages may be achieved by the disclosure. Further, the skilled person will appreciate that not all advantages stated above are necessarily achieved by embodiments described herein.

In the foregoing specification, the disclosure has been described with reference to specific example embodiments. It will be evident, however, that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, a plurality of connections may be replaced with a single connection that transfers multiple signals as a serial digital sequence, or in a time-multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit portions or impose an alternate decomposition of functionality upon various logic blocks or circuit portions. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner, such as components packaged together in a portion, or as components on board or a card. For example, processing in relation to different groups of profiles may be allocated to respective different integrated circuits.

Additionally, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, for example a Field Programmable Gate Array (FPGA).

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other portions or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim portion by the indefinite articles "a" or "an" limits any particular claim containing such introduced claim portion to inventions containing only one such portion, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the portions such terms describe. Thus, these terms are not necessarily intended to indicate temporal or other prioritization of such portions. The mere fact that certain measures are recited in mutually different claims does not indicate that a combination of these measures cannot be used to advantage.

As used throughout this application, the word "may" or "can" is used in a permissive sense (i.e., meaning having the potential or ability to do something), rather than the mandatory sense (i.e., meaning must). Similarly, the words "include," "including," and "includes" mean "including, but not limited to" the listed item(s).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

Unless specifically stated otherwise as apparent from the foregoing discussions, it is appreciated that throughout the present description of embodiments, discussions utilizing terms such as "adapting,", "adjusting," "calculating", "calibrating", "communicating," "computing:, "designating", "determining", "executing," "expressing,", "measuring," "sensing," "storing," "transmitting", "deriving", "obtaining," "operating," "receiving," "reading", "using,", or the like, refer to the actions and processes of an integrated circuit, an ASIC, a memory device, a computer system, or similar electronic computing device executing a computer readable program. The memory device or similar electronic computing device manipulates and transforms data represented as physical (electronic) quantities within the devices' registers and memories into other data similarly represented as physical quantities within the devices' memories or registers or other such information storage, transmission, or display devices.

We claim:

1. A modular fluid flow meter system, comprising:

a sensor module and a computing module, said sensor module detachably coupled to said computing module, said sensor module in operative communication with said computing module when said sensor module is said detachably coupled to said computing module, said sensor module comprising a first sensor and sensor module memory, said sensor module memory independent from said first sensor, said first sensor in communication with a fluid flowing through a fluid passageway, said fluid comprising a plurality of physical properties, said plurality of physical properties of said fluid comprising a plurality of fluid flow velocities and a first plurality of fluid temperatures, said first sensor adapted and configured to detect and measure said plurality of fluid flow velocities, said first sensor further adapted and configured to generate a plurality of fluid velocity signals representing said plurality of fluid flow velocities of said fluid, said sensor module memory comprising fluid flow rate calibration data, fluid viscosity compensation data and fluid temperature calibration data, said sensor module adapted to transmit said plurality of fluid velocity signals, said fluid flow rate calibration data, said fluid viscosity compensation data and said fluid temperature calibration data to said computing module when said computing module is said detachably coupled to said sensor module, said computing module comprising a computing module memory and a processing system, said computing module adapted to receive said plurality of fluid velocity signals, said fluid flow rate calibration data, said fluid viscosity compensation data and said fluid temperature calibration data from said sensor module, said processing system programmed and configured to determine a standard flow rate of said fluid as a function of said plurality of fluid velocity signals and said fluid flow rate calibration data.

2. The system of claim 1, wherein said sensor module further comprises a second sensor in communication with said fluid said flowing through said fluid passageway, said second sensor adapted and configured to detect and measure said first plurality of fluid temperatures, generate a plurality of fluid temperature signals representing said first plurality of fluid temperatures and transmit said plurality of fluid temperature signals to said computing module.

3. The system of claim 2, wherein said sensor module further comprises a third sensor in communication with atmospheric air proximate to said fluid, said third sensor adapted and configured to detect and measure ambient temperature of said atmospheric air, generate at least a first ambient temperature signal representing said ambient temperature and transmit said at least first ambient temperature signal to said computing module.

4. The system of claim 3, wherein said computing module further comprises fluid characteristics data of said fluid, fluid temperature scaling data and flow rate scaling data representing units of measure of fluid flow.

5. The system of claim 4, wherein said fluid characteristics data comprises a table comprising a second plurality of fluid temperatures and a plurality of viscosities of said fluid at said second plurality of fluid temperatures.

6. The system of claim 5, wherein said processing system is further programmed and configured to determine an operating fluid viscosity of said fluid as a function of said plurality of fluid temperature signals, said at least a first ambient temperature signal, said fluid temperature calibration data and said fluid characteristics data.

7. The system of claim 6, wherein said processing system is further programmed and configured to determine an adjusted fluid flow rate of said fluid as a function of said standard flow rate of said fluid, said operating fluid viscosity of said fluid and said fluid viscosity compensation data.

8. The system of claim 7, wherein said processing system is further programmed and configured to determine a fluid flow rate output of said fluid as a function of said adjusted fluid flow rate of said fluid and said flow rate scaling data.

9. The system of claim 8, wherein said processing system is further programmed and configured to determine an adjusted temperature of said fluid as a function of said plurality of fluid temperature signals, said at least a first ambient temperature signal and said fluid temperature calibration data.

10. The system of claim 9, wherein said processing system is further programmed and configured to determine a temperature output of said fluid as a function of said adjusted temperature of said fluid and said temperature scaling data.

* * * * *